A. CONNELL.
TOOL HOLDER FOR LATHES.
APPLICATION FILED JUNE 2, 1919.

1,331,322. Patented Feb. 17, 1920.

Witnesses:
E. Alder
M. Fraix

Inventor:
Alexander Connell
by C. Tewes
His Attorney

UNITED STATES PATENT OFFICE.

ALEXANDER CONNELL, OF GLASGOW, SCOTLAND.

TOOL-HOLDER FOR LATHES.

1,331,322.  Specification of Letters Patent.  Patented Feb. 17, 1920.

Application filed June 2, 1919. Serial No. 301,309.

*To all whom it may concern:*

Be it known that I, ALEXANDER CONNELL, a subject of the King of Great Britain, residing at Glasgow, Scotland, Great Britain, have invented certain new and useful Improvements in Tool-Holders for Lathes, of which the following is a specification.

This invention relates to improvements in tool-holders for lathes adapted for tools for forming and recessing work, of the type in which there is provided a spring normally tending to maintain the tool proper in inoperative position.

A tool-holder according to the invention comprises a tubular member designed to enter a turret, bored eccentrically and movable axially with the turret in the operation of the lathe, said tubular member being formed with a helical slot entered by a follower or stud on a slide rod or tool-holder proper accommodated within the bore of the tubular member, said slide rod carrying directly or indirectly the cutting tool and being urged by a spring normally acting to maintain the follower in such a position within the slot that the tool proper is in inoperative position.

A graduated ring or nut may be threaded on to the tubular member so as to cover part of the slot and form an adjustable stop for the follower when moved in opposition to the spring.

For recessing or inside work the slide rod is preferably bored eccentrically to receive the stem of the cutting tool proper.

In a construction for forming outside work the slide rod is fitted with a stirrup-like carrier in which the tool proper is held adjustably in position; within or on the slide rod is adjustably fitted a stop member adapted to engage the end of the work remote from the chuck or work-carrier to arrest axial movement of the rod and bring into play the stud and helical slot device, whereby the cutting tool is rocked into cutting position.

In the drawings:—

Similar parts are designated by like references in all the views.

Figure 1:
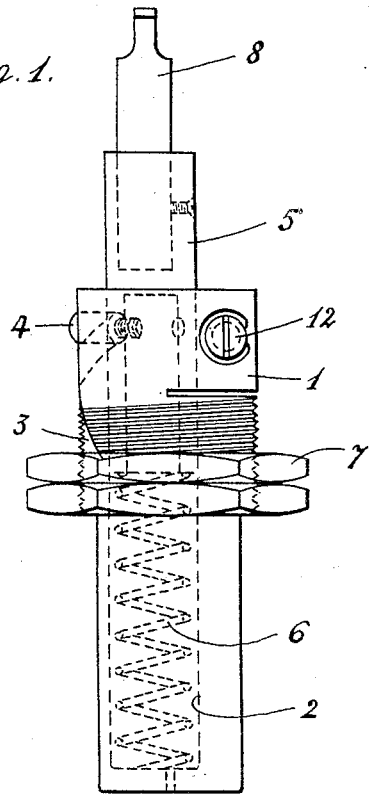
Figures 1 and 2 are side elevations at right angles to one another of the tool holder.

Referring to the drawings, 1 denotes the tubular member which is bored eccentrically at 2 and is formed with a helical slot 3 entered by a follower stud 4 on a slide rod 5 normally urged forwardly by a spring 6. Threaded on the tubular member 1 is a graduated nut or ring 7 adapted partially to cover the slot as aforesaid.

Figure 2:
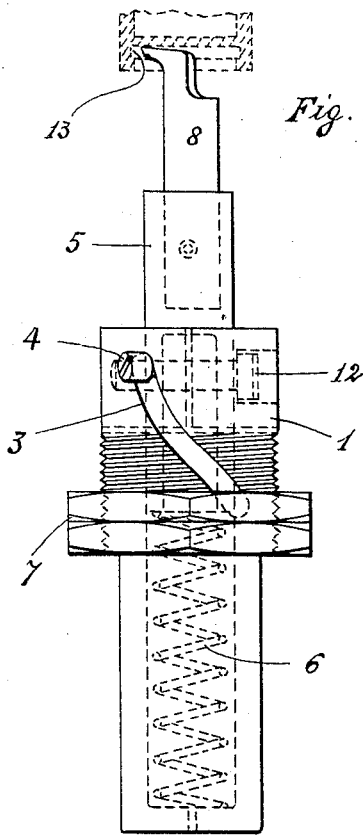
Figure 3:
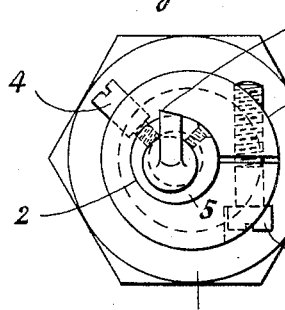
Fig. 3 is an end view of the same adapted for recessing or inside work.

In the arrangement shown in Figs. 1 to 3 the slide rod 5 carries the tool proper 8.

Figure 4:
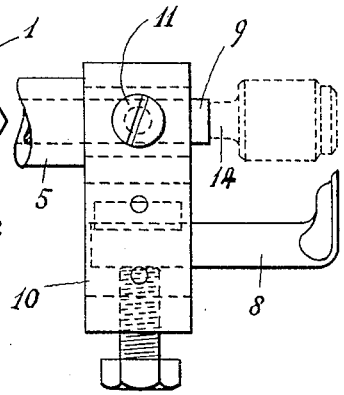
Figs. 4 and 5 show in side elevation and end view, respectively, an attachment employed for forming or outside work.
Figure 5:
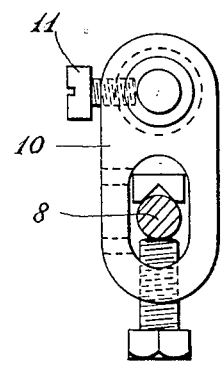

In the arrangement shown in Figs. 4 and 5 the slide rod 5 carries a stop 9 and a stirrup-like tool carrier 10 in which the tool proper 8 is adjustably clamped, the said stop 9 and carrier 10 being adjustably secured by the screw 11. The tubular member 1 is shown as being partially split, the parts separated by the split being clamped together by a screw 12.

The embodiment illustrated in Figs. 1 to 3 is designed primarily for recessing work wherein the recess is to be formed adjacent to a shoulder 13 in the work indicated in dotted lines in Fig. 2, such shoulder entering only into frictional contact with the non-cutting forward edge of the tool. The shoulder serves to arrest the progress of the slide rod axially and in effect to impart rocking movement to the cutting tool proper whereby the cutting edge is brought into operative relationship with the work.

It will be seen that, during the cutting operation, the abutment of the non-cutting forward edge against the shoulder 13 counteracts any tendency for the tool to rock into inoperative position.

In the embodiment illustrated in Figs. 4 and 5 the axial movement of the slide rod is resisted by the outer end 14 of the work, the slide rod being constrained to perform a rocking movement and therewith the cutting tool into operative relationship with the work.

Having now fully described my said invention what I claim and desire to secure by Letters Patent is:—

1. In the herein described tool-holder for lathes, the combination, with a tubular member formed with a helical slot and bored eccentrically and movable axially, of a tool-carrying slide rod accommodated within the bore of the tubular member, a follower stud fitted on the said slide rod and entering said helical slot, and a spring mounted within the bore and acting on the slide rod and tending to maintain the tool proper in inoperative position.

2. In a tool-holder of the type described, the combination, with a tubular member bored eccentrically and formed with a helical slot, of a spring-influenced slide rod accommodated within the bore of the tubular member, a follower stud fitted on the said slide rod and entering said slot, a stirrup-like tool-carrier and a stop carried by the slide rod, means to adjustably secure said carrier and stop to the slide rod, and means to clamp the tool proper within the tool-carrier, all substantially as and for the purpose set forth.

In testimony whereof I have hereunto set my hand in the presence of two subscribing witnesses.

ALEXR. CONNELL.

Witnesses:
  JOHN MARTIN,
  K. McLEMAN.